March 1, 1960   M. E. McCLELLAN   2,926,599
TYING MECHANISM FOR BALERS AND THE LIKE
Filed Oct. 18, 1957   3 Sheets-Sheet 1

INVENTOR.
M. E. McCLELLAN

March 1, 1960 M. E. McCLELLAN 2,926,599
TYING MECHANISM FOR BALERS AND THE LIKE
Filed Oct. 18, 1957 3 Sheets-Sheet 2

INVENTOR.
M. E. McCLELLAN

March 1, 1960

M. E. McCLELLAN 2,926,599

TYING MECHANISM FOR BALERS AND THE LIKE

Filed Oct. 18, 1957

INVENTOR.
M. E. McCLELLAN

United States Patent Office 2,926,599
Patented Mar. 1, 1960

2,926,599

TYING MECHANISM FOR BALERS AND THE LIKE

Marcus E. McClellan, Ottumwa, Iowa, assignor, by mesne assignments, to Deere & Company, a corporation of Delaware Application October 18, 1957, Serial No. 691,055

6 Claims. (Cl. 100—22)

This invention relates to tying mechanism for agricultural balers and the like and has for its principal object the provision of improved means for controlling the twine or equivalent strand so that faulty operation due to failure to strip the bill hook of previously tied knots or partial knots is eliminated.

Reference will be had herein to the problems encountered in twine tying means for agricultural balers; although, it will be apparent that these problems are or may be present also in other types of machines, such as binders and the like, using tying or strand material other than twine. However, in the intersts of simplicity and familiarity with present day structures and methods, the indicated reference will be resorted to.

The typical tying mechanism comprises a knotter having a twine holder from which twine extends to encircle a bale, a needle being involved in completing the encirclement and in returning a needle-carried portion of the twine back to the twine disk or holder. Thus, there are presented in a certain zone a pair of twine portions lying alongside each other and these portions are twisted into a bight and a portion thereof pulled through the bight to form a double overhand knot. The tying mechanism includes several components working in timed relationship so that theoretically the mechanism ties one knot for each bale and readies the twine for encircling a succeeding bale. Primarily in the case of agricultural balers, the removal of the tied knot from the bill hook involves mechanical stripping by a movable member combining a knife which cuts the twine from the twine disk so that the tied bale is complete in itself. Because of maladjustment or other reasons, the tying mechanism, being inherently relatively complicated, suffers at times from faulty operation. For example, in some instances the mechanism fails to function properly and the result is that a knot or partial knot is left on the bill hook. Consequently, subsequent operation of the mechanism is prevented and the bill hook attempts to tie succeeding knots, with the result that the twine is built up on the bill hook, causing severe damage to the parts, let alone a succession of untied bales. Specifically, one major problem occurs in the event that the twine that runs initially around the bale slips from the twine holder and thus escapes the bill hook. Consequently, the twine brought up by the needle is the only twine tied and a single rather than a double knot is formed. The single knot has a tendency to hang onto the bill hook tongue, because the conventional stripper fails to remove the single knot. The remainder of the twine is of course caught between succeeding bales and is held there by friction. As the bales move along, the twine is placed under tension and if it does not break and remove itself from the bill hook tongue, it alternatively breaks off the bill hook tongue. If any portion of the knot remains on the bill hook, it interferes with a subsequent knot and if the tying mechanism is operated for any appreciable time without discovering the defect, the succeeding knots build up on the bill hook and ultimately the entire tying mechanism may suffer.

Experience has shown that the defect just noted can be corrected by proper timing and adjustment of the tying mechanism, but in a field operation maladjustment may go unnoticed for quite some time. Accordingly, it is an object of the present invention to provide means for eliminating the natural results of the maladjustment just referred to, and this provision resides in means for controlling the twine or equivalent strand so that even though a single knot is tied by the bill hook, it will be stripped therefrom so that the tying mechanism is at least in condition for proper operation on the next bale. The invention resides primarily in means for holding the twine in such position relative to the bill hook and stripper that the stripper can exert the proper force and in the proper direction on the twine so as to strip it completely from the bill hook. In one form of the invention, the twine control means includes a twine finger or similar member mounted in such manner that when the conventional tucker moves the twine into proximity to the bill hook, the tucker transfers the twine to the finger so that the finger holds the twine in proper position even though the tucker returns to a starting position. In another form of the invention, the twine control means is incorporated in the stripper itself, the invention again featuring means for maintaining the twine in a position proximate to the bill hook for proper action thereon by the stripper.

It is a further object of the invention to provide the invention in forms in which it may be readily incorporated in existing twine tying mechanisms.

The foregoing and other important objects and desirable features inherent in and encompassed by the invention will become apparent as the preferred embodiments thereof are disclosed in detail in the ensuing specification and accompanying sheets of drawings, the several figures of which are described below.

Figure 1:
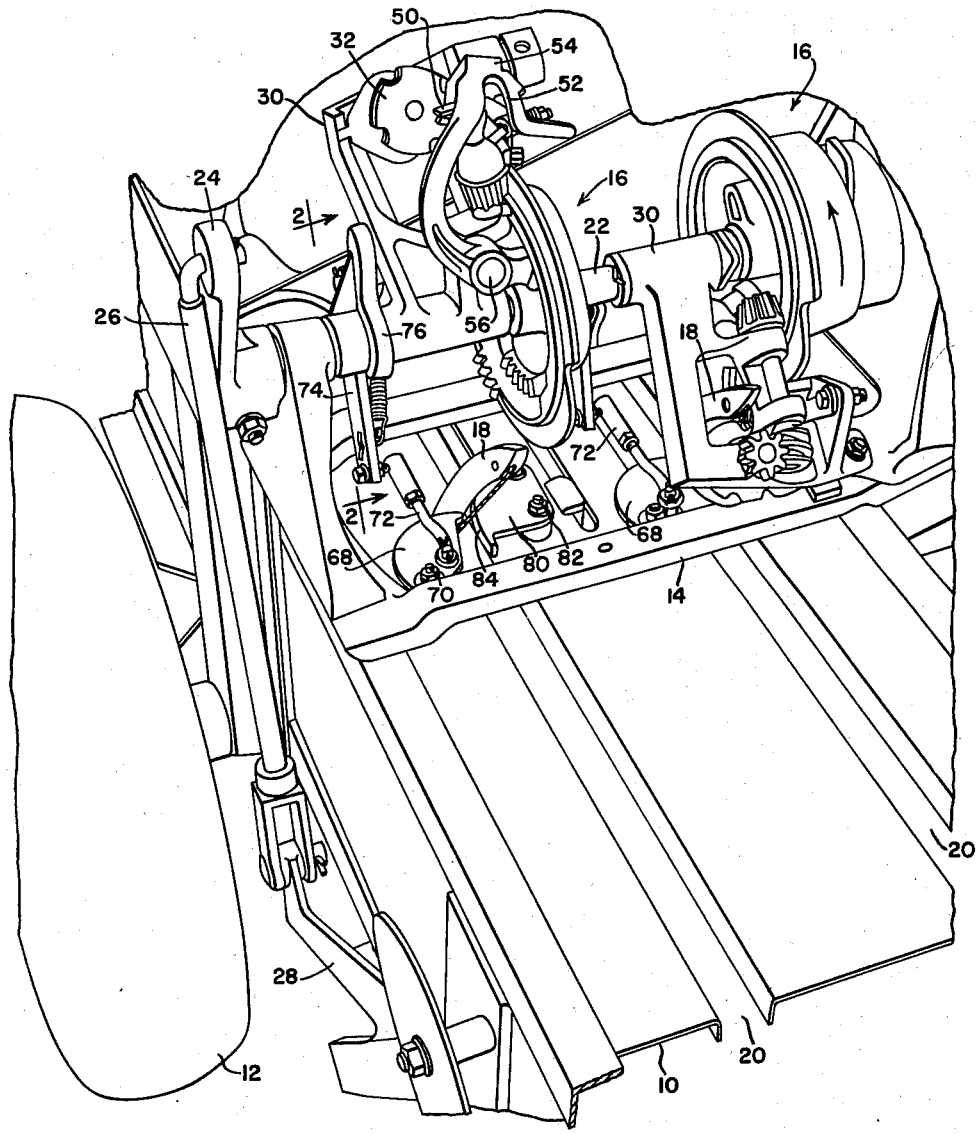
Fig. 1 is a fragmentary perspective of the upper portion of a baler having two tying mechanisms thereon, one mechanism being inverted to expose the underside thereof and to expose the needle, the tucker and the twine finger.

Those versed in the art will recognize in Fig. 1 the intermediate upper portion of an agricultural baler as including a bale case 10, a supporting wheel 12, and knotter support structure 14. The knotter support structure carries a pair of identical knotters, each indicated in its entirety by the numeral 16. Conventional baling mechanism forms succeeding bales in the bale case 10 and these are tied by the knotters 16—16 in conjunction with a pair of twine needles 18. The bale case has a pair of longitudinal slots 20 for accommodating the needles.

The knotter support structure 14 journals a shaft 22 which is common to both knotters 16—16 and which has at one end a crank arm 24 rigid thereon. This arm is connected by a pitman or link 26 to a needle frame 28 which carries the two needles 18. These details are sufficiently well-known as to require no elaboration here. Suffice it to say that as the shaft 22 rotates, it brings the needles up from a down position to a position a little beyond that shown in Fig. 1 and returns the needles to the down position preparatory to the formation of a succeeding bale, since the needles and the baling plunger carrying a charge of hay or other material cannot occupy the baling chamber at the same time.

As already indicated, the left hand knotter 16 in Fig. 1 is inverted, being swung upwardly about the axis of the shaft 22 so as to expose the under portions thereof as well as to illustrate more clearly the position of the needle 18 and its associated parts. The normal operating position of the knotter will be the same as that at the right hand side of Fig. 1. The general principle of operation is that the knotter shaft rotates cylically through one complete revolution to form each knot, and the mechanism for controlling this includes a conventional clutch (not shown) timed with the plunger and means for measuring the bale so that when the bale attains a predetermined length, operation of the knotters is initiated and the knot is tied by each within an interval involving movement of the needles 18 between the two positions previously noted.

Figure 3:
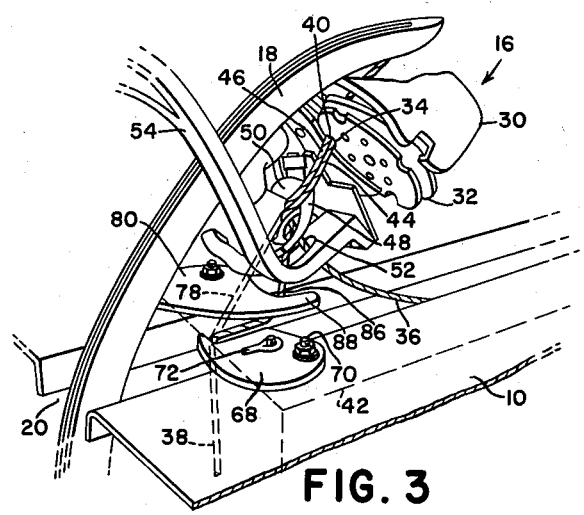
Fig. 3 is a perspective from a different angle and showing part of the tying mechanism in a condition in which the bill hook is just starting to rotate.
Figure 4:
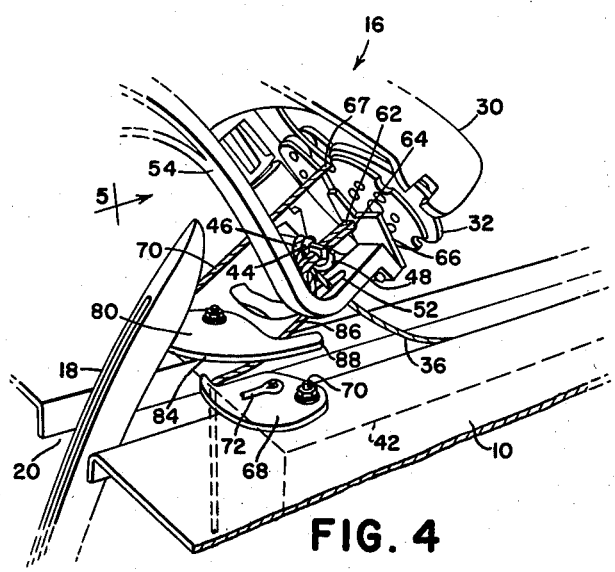
Fig. 4 is similar to Fig. 3 but shows the parts in the position after the knot has been completed but before it is stripped from the bill hook.

Each knotter includes a knotter frame 30 on which the knotter parts are carried. A fundamental part of the knotter is the strand holder means, commonly referred to as a twine holder, a typical one of which is shown at 32. As best seen in Figs. 3 and 4, the twine holder 32 is located above the associated slot 20 in the bale case 10 and carries one end 34 of a strand or twine 36 that extends downwardly through the slot 20 and in a position to be engaged by a bale being formed. After the bale is formed, the twine 36 extends in a rearward loop having an upper portion along the top of the bale, a rearward portion descending at the rear of the bale, and a forward under portion extending forwardly at the bottom of the bale. Encirclement of the bale by the twine is completed by the needle 18, which carries a forward portion of the twine, at 38, upwardly at the front of the bale and back to the twine holder 32, at which point it is engaged by the twine holder alongside the previously held twine portion 34, as at 40. The front forward corner of the bale is shown in dotted lines and is designated by the numeral 42. It is believed to be clear that, based on general knowledge, the bale is encircled by the twine and the two end portions 34 and 40 are held in the twine holder 32 as best seen in Fig. 3. There are thus a pair of parallel twine portions 44 and 46 which extend down from the twine holder 32 to the bale 42, and in so doing these twine portions lie across the finger or jaw 48 of a typical rotatable bill hook 50.

Figure 5:
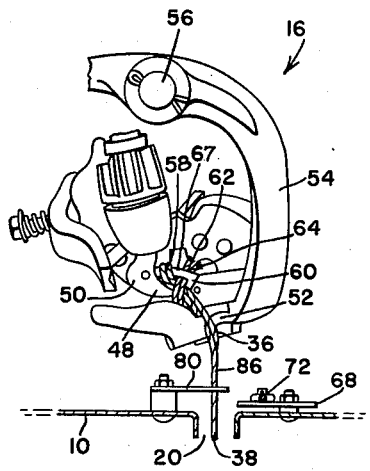
Fig. 5 is an end view, with parts omitted, of the structure shown in Fig. 4, the view being seen along the line 5—5 of Fig. 4.

That portion of the twine that extends from the bill hook to the bale passes through the forwardly opening throat 52 of a swinging member or wiper or knife arm 54, pivoted to the knotter frame at 56 so that its lower end, in which the throat 52 is formed, is swingable lengthwise of and below the lower jaw or finger 48 of the bill hook 50 (Fig. 5). The purpose of this arrangement is to enable the wiper arm 54 to strip the completed knot from the bill hook, which is a conventional function. A typical prior art example of the mechanism, at least to the extent described, appears in the U.S. patent to Graham 397,355, and further reference may be had to the U.S. patent to Johnston 740,139 for a typical illustration of how the knot is formed by the bill hook.

For present purposes, it will suffice to note that as the bill hook rotates, in a direction away from the observer as shown in Fig. 3 it forms a double bight 58 (Fig. 5) about the bill hook jaw 48 and about the bill hook tongue 60. Just before the bill hook attains the position of Fig. 4, the tongue opens relative to the jaw and grasps the two twine portions 62 and 64 that extend from the twine holder 32 to the bill hook. The wiper arm 54 carries a knife 66 (Fig. 4) which operates in close cooperation with the twine holder 32 to sever these twine portions 62 and 64 from the disk. In the meantime, the needle, which has brought the twine portion 38 up to be gripped by the twine holder 32 at 40 starts to descend, leaving a new portion 67 gripped in the twine holder 32 so that a continuation portion 70 of the newly gripped portion 67 becomes substituted for the previously described portion 36 in the formation and tying of a succeeding bale.

As the stripper or wiper arm 54 swings beyond or to the right of the position shown in Fig. 5, it will wipe the bight 58 over the gripped portions 62 and 64 to form a double overhand knot and the completion of the stripping action will result in wiping the entire knot from the bill hook so that the bill hook is free for the formation of a succeeding knot.

The foregoing covers the general typing operation. Although the several parts of the tying mechanism are illustrated but not described, it is believed that their function will be readily apparent to those versed in the art, since in general the structure does not depart from knotters known for the past 50 or 60 years.

Figure 2:
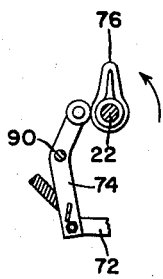
Fig. 2 is a fragmentary view, on a reduced scale and partly in section, as seen generally along the line 2—2 of Fig. 1.

As a further adjunct to the operation of known knotters, a tucker means, here a tucker finger 68, is provided for moving the twine portion 38 into close proximity to the bill hook. This tucker finger is pivoted to the top of the bale case on an upright pivot at 70 and is driven by a link 72 from a rocking lever 74 by power derived in the first instance from a cam 76 on the knotter shaft 22. This is illustrated generally in Fig. 2 and again in Fig. 1. It will be seen that as the knotter shaft 22 rotates in the direction of the arrow, it will rock the lever 74 which through the link 72 will swing the tucker finger from the position of Fig. 1 to that of Fig. 6. As the tucker finger performs this function, the nose thereof engages the twine portion 38 just above the bale and moves it rearwardly and farther into the wiper arm throat 52, thus positioning the strand portion for better engagement by the bill hook. In a conventional knotter, the tucker finger 68 is again swung forwardly, thus releasing the strand portion and leaving it to the bill hook to retain the strand portion for proper control during the tying operation. Fig. 3 shows in dotted lines at 78 the position of the strand portion before engagement by the tucker finger and after the tucker finger returns to its normal forward position in a conventional knotter.

Figure 6:
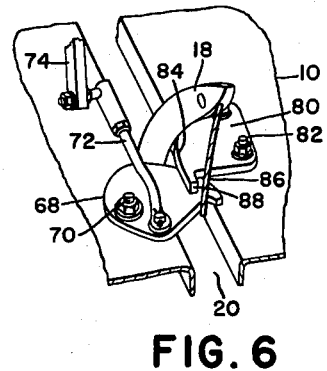
Fig. 6 is a fragmentary perspective showing a portion of the structure illustrated in Fig. 1 but in a different position.

As indicated above, this relationship has been found to contribute to malfunctioning of the tying mechanism in those cases in which the twine tension on the twine holder 32 is insufficient to hold the strand portion 34, allowing this strand portion to slip out of place and pass the bill hook so that when the bill hook operates it ties a knot in only the strand portion 38—40. This type of single knot has the tendency to attach itself to the bill hook tongue, and therefore cannot be stripped by the stripping action of the wiper arm 54. According to the present invention, the twine portion between the front upper corner of the bale 42 and the gripped portion 40 is controlled by a twine finger 80 having means such as bolts 82 for the rigid affixation thereof to the top of the bale case in lateral offset proximity to the tucker finger 68, with the twine finger slightly elevated relative to the tucker finger so that the latter may pass under the former (Fig. 6). The outer guiding edge 84 of the twine finger also laterally overlaps the slot 20 in the bale case 10 so that when the tucker finger moves from its forward position (Fig. 1) to its rear position (Fig. 6) the twine portion 86 between the terminal end of the needle 18 and the front portion of the bale 42 is caused to snap around a hook or nose 88 on the twine finger, whereby when the tucker finger returns to its forward or normal position the hooked nose 88 retains the twine portion 86 as shown in full lines in Fig. 3, thus retaining this portion farther rearwardly in the throat 52 of the wiper arm 54 and improving the stripping action of the wiper arm on the bill hook, even in those situations in which only a single rather than a double knot is tied.

It will be understood that a tucker 68 and a twine finger 80 are provided also for the other knotter, the constructions in both cases being identical and the tucker 68 being driven from the knotter shaft by the cam 76 and a transverse shaft 90 common to the tucker finger operating levers 74. These, however, are details that could be varied without departing from the spirit and scope of the invention, the important thing being that the twine finger 80 affords means separate from the tucker finger 68 for retaining the twine portion 86 in a rearward position as already described.

Figure 7:
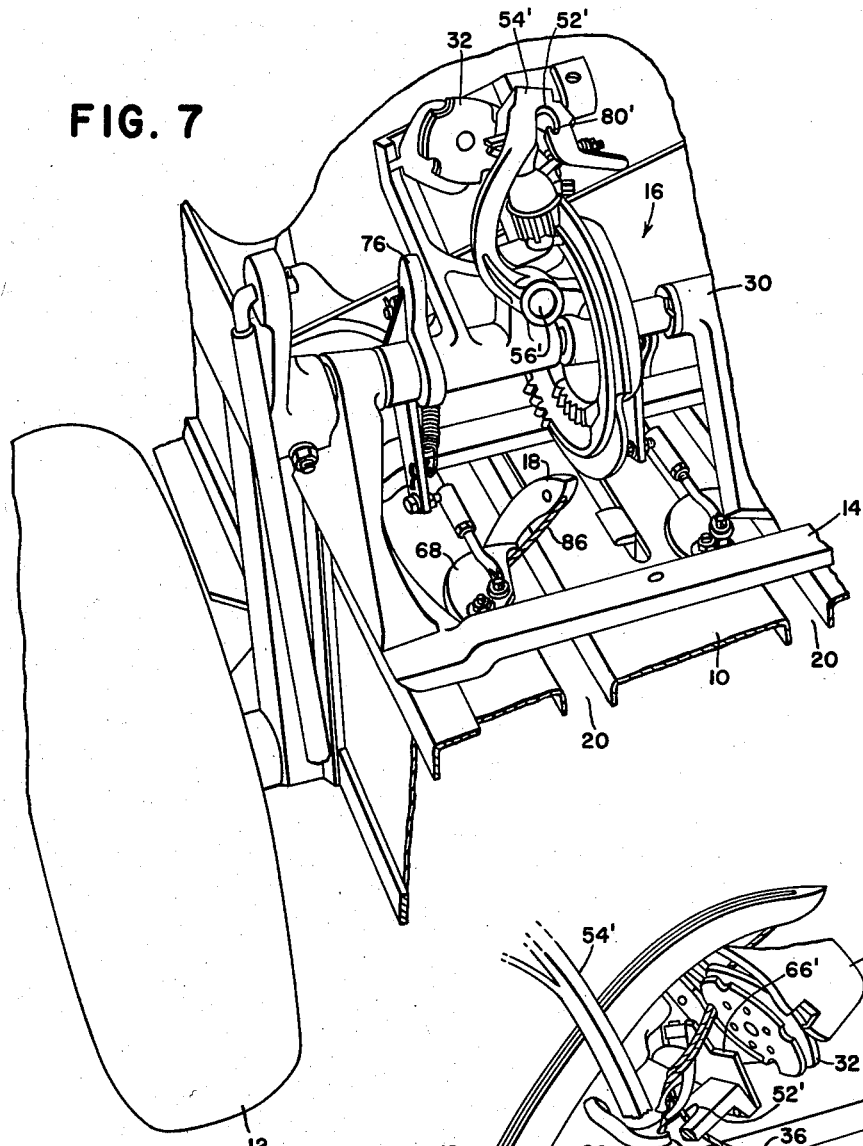
Fig. 7 is a view similar to Fig. 1 but showing the form of the invention in which the twine control means is incorporated in the knife or stripper arm of the knotter.
Figure 8:
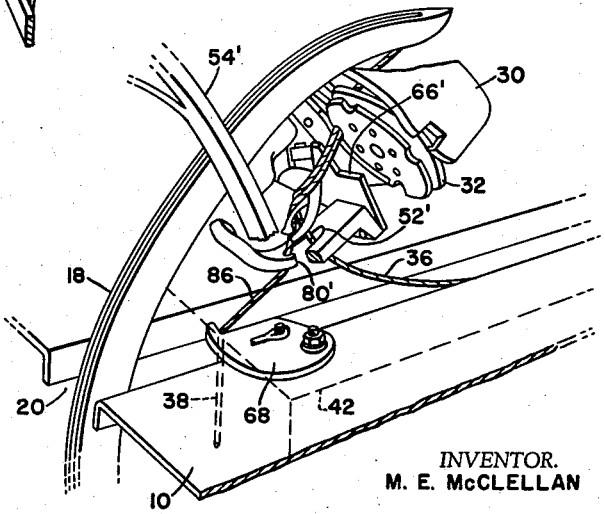
Fig. 8 is a view similar to Fig. 3 but showing that form of the invention illustrated in Fig. 7.

Figs. 7 and 8 show a modification of the structure just described. To the extent that the two have common parts, similar reference characters will be employed without further description in detail. For example, the structure shown in Fig. 7 has the bale case 10, slotted at 20, to accommodate a pair of needles 18, only one of which appears in this figure. Since, however, there are differences in the wiper arm, that shown in Figs. 7 and 8 is designated by the numeral 54' and is shown as having a throat 52' and a knife 66' for cooperation with the twine holder 32. Fundamentally, the problem solved is the same as that previously discussed and the structure is also fundamentally similar, depending upon the movable tucker finger 68 for moving the twine portion 86 farther rearwardly into the throat 52' of the wiper arm 54'. Comparable strand portions and relationship of the parts thereto will be observed by comparing Fig. 8 with Fig. 3. The distinction between the two forms of the invention is that whereas the structure of Figs. 1 through 6 has the stationary twine finger 80 for retaining the rearward position of the twine portion 86, that shown in Figs. 7 and 8 utilizes a hooked lug or projection 80' on a portion of the wiper arm itself. As will be noted, retention of the twine portion 86 is accomplished by the lug or projection 80' and the over-all function achieved by the structure of Figs. 1 through 6 is achieved also in Figs. 7 and 8.

The primary advantage of the both forms of the invention is that each serves as a perfect solution for the problem noted. Further than that, it is significant to note that the two forms may each be readily incorporated in existing designs. As for the structure shown in Figs. 1 through 6, it is a simple matter to provide the twine fingers and to bolt them in place. As for Figs. 7 and 8, a modified form of knife arm may be readily provided, or conversion may be effected in the field by adding a lug or projection such as that shown at 80'.

Features and advantages other than those categorically enumerated will readily occur to those versed in the art, as will equivalent solutions based on the present disclosure, all of which may be achieved without departure from the spirit and scope of the invention.

What is claimed is:

1. In tying mechanism for tying together opposite end portions of a bundle-encircling strand and including a bill hook having a strand-receiving finger and tongue, a wiper arm below the bill hook finger and movable lengthwise thereof for stripping the strand from the finger and having a forwardly facing strand-receiving throat, strand holder means behind the bill hook and from which the strand extends forwardly over the bill hook finger and downwardly through the wiper arm throat and thence around the rear of the bundle, and needle means for carrying the strand upwardly around the front of the bundle and through the wiper arm throat and across the bill hook finger and back to the strand holder means so that a pair of strand portions lie side by side across the bill hook finger to be formed into a doubled bight by rotation of the bill hook and through which bight adjacent portions of the strand are caused to pass by the bill hook tongue to complete the knot when the wiper arm strips the bight from the finger, the improvement comprising: tucker means below the wiper arm and movable between a front position adjacent to the entrance to the wiper arm throat and a rear position substantially rearwardly of said throat entrance, said tucker means having a strand-engaging element thereon for moving rearwardly that portion of the needle-carried strand that extends from the bill hook finger to the front of the bundle so that said strand portion is urged to said rear position and thus farther rearwardly into the wiper arm throat, means for moving the tucker means rearwardly from and forwardly back to its front position, and strand-retaining means separate from the tucker means for receiving the rearwardly moved strand portion from the tucker means when said tucker means moves to its rear position and having a strand-retaining element at said rear position for retaining said strand portion in said rear position when the tucker means moves forwardly.

2. The invention defined in claim 1, in which: the strand-retaining means comprises a lug on the wiper arm and projecting partially across the wiper arm throat at a rear portion of said throat.

3. In tying and bailing mechanism including a bale case for forming a bale and for tying together opposite ends of a bale-encircling strand and further having a bill hook having a strand-receiving finger and tongue, a wiper arm below the bill hook finger and movable lengthwise thereof for stripping the strand from the finger and having a forwardly facing strand-receiving throat, strand holder means behind the bill hook and from which the strand extends forwardly over the bill hook finger and downwardly through the wiper arm throat and thence around the rear of the bale and needle means for carrying the strand upwardly around the front of the bale and through the wiper arm throat and across the bill hook finger and back to the strand holder means so that a pair of strand portions lie side by side across the bill hook finger to be formed into a doubled bight by rotation of the bill hook and through which bight adjacent portions of the strand are caused to pass by the bill hook tongue to complete the knot when the wiper arm strips the bight from the finger, the improvement comprising: tucker means mounted on the bale case below the wiper arm and movable between a front position adjacent to the entrance to the wiper arm throat and a rear position substantially rearwardly of said throat entrance, said tucker means having a strand-engaging element thereon for moving rearwardly that portion of the needle-carried strand that extends from the bill hook finger to the front of the bale so that said strand portion is urged to said rear position and thus farther rearwardly into the wiper arm throat, means for moving the tucker means rearwardly from and forwardly back to its front position, and strand-retaining means separate from the tucker means and mounted on the bale case below the wiper arm and rearwardly of the tucker means for receiving the rearwardly moved strand portion from the tucker means when said tucker means moves to its rear position and having a strand-retaining element at said rear position for retaining said strand portion in said rear position when the tucker means moves forwardly.

4. The invention defined in claim 3, in which: the strand-retaining means comprises a rigid member fixed to the bale case and having a strand-guiding edge along which said strand portion is moved by the rearwardly moving tucker means and a rearwardly projecting retaining finger over which said strand portion hooks and which retains said strand portion when the tucker means moves forwardly.

5. In tying mechanism for tying together opposite end portions of a bundle-encircling strand and including a bill hook having a strand-receiving finger and tongue, a wiper arm below the bill hook finger and movable lengthwise thereof for stripping the strand from the finger, strand holder means behind the bill hook and from which the strand extends forwardly over the bill hook finger and downwardly past the wiper arm and thence around the rear of the bundle, and needle means for carrying the strand upwardly around the front of the bundle and past the wiper arm and across the bill hook finger and back to the strand holder means so that a pair of strand portions lie side by side across the bill hook finger to be formed into a doubled bight by rotation of the bill hook and through which bight adjacent portions of the strand are caused to pass by the bill hook tongue to complete the knot when the wiper arm strips the bight from the finger, the improvement comprising: tucker means below the wiper arm and movable between a front position relatively forwardly as respects the bill hook and a rear position relatively rearwardly as respects the bill hook, said tucker means having a strand-engaging element thereon for moving rearwardly that portion of the needle-carried strand that extends from the bill hook finger to the front of the bundle so that said strand portion is urged to said rear position and thus substantially directly below the bill hook, means for moving the tucker means rearwardly from and forwardly back to its front position, and strand-retaining means separate from the tucker means for receiving the rearwardly moved strand portion from the tucker means when said tucker means moves to its rear position and having a strand-retaining element at said rear position for retaining said strand portion.

6. The invention defined in claim 5, in which: the strand-retaining means comprises a lug on the wiper arm and projecting laterally therefrom at a rear portion thereof.

References Cited in the file of this patent

UNITED STATES PATENTS

| | | |
|---|---|---|
| 397,355 | Graham | Feb. 5, 1889 |
| 697,750 | Pridmore | Apr. 15, 1902 |
| 740,139 | Johnston | Sept. 29, 1903 |
| 988,222 | Stange | Mar. 28, 1911 |